(12) United States Patent
Seiberle et al.

(10) Patent No.: US 6,876,417 B1
(45) Date of Patent: *Apr. 5, 2005

(54) METHOD OF IMPARTING PREFERRED ALIGNMENT IN LIQUID CRYSTAL CELLS

(75) Inventors: Hubert Seiberle, Weil am Rhein (DE); Martin Schadt, Seltisberg (CH)

(73) Assignee: Rolic AG, Zug (CH)

( * ) Notice: Subject to any disclaimer, the term of this patent is extended or adjusted under 35 U.S.C. 154(b) by 0 days.

This patent is subject to a terminal disclaimer.

(21) Appl. No.: 09/890,553

(22) PCT Filed: Jan. 25, 2000

(86) PCT No.: PCT/IB00/00065

§ 371 (c)(1),
(2), (4) Date: Aug. 2, 2001

(87) PCT Pub. No.: WO00/46634

PCT Pub. Date: Aug. 10, 2000

(30) Foreign Application Priority Data

Feb. 3, 1999 (GB) ............................................. 9902404

(51) Int. Cl.$^7$ ............................................. G02F 1/1337
(52) U.S. Cl. ........................ 349/124; 349/123; 349/125; 349/129
(58) Field of Search ............................... 349/123–125, 349/129, 189; 252/299.4; 430/321; 528/353

(56) References Cited

U.S. PATENT DOCUMENTS

| | | | | |
|---|---|---|---|---|
| 5,587,822 A | * | 12/1996 | Lee .............................. | 349/124 |
| 5,629,056 A | * | 5/1997 | Koike et al. ................. | 349/123 |
| 5,912,717 A | * | 6/1999 | Sugiyama et al. ........... | 349/124 |
| 5,929,201 A | * | 7/1999 | Gibbons et al. ............. | 528/353 |
| 5,958,292 A | * | 9/1999 | Gibbons et al. ......... | 352/299.4 |
| 6,001,277 A | * | 12/1999 | Ichimura et al. ......... | 252/299.4 |
| 6,208,405 B1 | * | 3/2001 | Sakong et al. .............. | 349/189 |
| 6,295,111 B1 | * | 9/2001 | Kim et al. ................... | 349/124 |
| 6,306,563 B1 | * | 10/2001 | Xu et al. ..................... | 430/321 |
| 6,633,351 B2 | * | 10/2003 | Hira et al. ..................... | 349/95 |
| 6,646,703 B1 | * | 11/2003 | Seiberle et al. ............. | 349/124 |

FOREIGN PATENT DOCUMENTS

| | | |
|---|---|---|
| EP | 0 788 012 | 8/1997 |
| GB | 2 319 093 | 5/1998 |

OTHER PUBLICATIONS

Yoshida et al., "Inclined Homeotropic Alignment by Irradiation of Unpolarized UV light", Jpn. J. App. P., vol. 39, pp. L428–431 (1997).

Lim et al., "Tilting of Liquid Crystal through Interaction with Methyl Orange Molecules Oriented by Circularly Polarized Light", Jpn. J. App. Phys., vol. 35, pp. L1281–L1283 (1996).

Seo et al., "Investigation of pretilt angle generation in nematic liquid crystal with oblique non–polarized UV light irradiation on polyimide films", Liquid Crystals, vol. 23, No. 6, pp. 923–925 (1997).

Zili Li, "Photopolymerization induced orientation transition in a nematic liquid crystal cell", Liquid Crystals, vol. 19, No. 3, pp. 307–311 (1995).

* cited by examiner

Primary Examiner—Huyen Ngo
(74) Attorney, Agent, or Firm—Finnegan, Henderson, Farabow, Garrett & Dunner, L.L.P.

(57) ABSTRACT

A liquid-crystal cell has a wall able to impart both the preferred tilt and preferred azimuthal alignment to the liquid-crystal molecules in use in the cell. The wall is made by exposing a material on it to oblique radiation which is circularly polarized or unpolarized, wherein multiple local zones of the material are exposed to radiation, the oblique angle of the radiation being uniform within each local zone but different between two or more zones and wherein locally different oblique radiation is applied in one radiation step by interposing a micro element array between the source of the radiation and the material.

18 Claims, 5 Drawing Sheets

METHOD OF IMPARTING PREFERRED ALIGNMENT IN LIQUID CRYSTAL CELLS

This application is a national stage filing under 35 U.S.C. §371 of international application no. PCT/IB00/00065, filed on Jan. 25, 2000, which published in the English language. This application also claims the benefit of priority under 35 U.S.C. §119(a) to GB patent application no. 9902404.4, filed on Feb. 3, 1999.

This invention relates to a method of imparting a property to a layer, the property being that liquid crystal molecules which may be placed on the layer would adopt a preferred alignment. The invention also relates to LCD elements incorporating a preferred alignment.

BACKGROUND OF THE INVENTION

The operation of liquid crystal devices (e.g. liquid crystal displays and light valves and liquid crystal polymer elements such as optical retarders, polarisers, cholesteric filters etc.) requires controlled alignment and usually also pretilt of the liquid crystals. Currently, a mechanical rubbing technique is used to prepare surfaces which are capable of inducing alignment and pretilt.

To overcome the disadvantages of the rubbing technique, several optical methods have been developed, which use linearly polarised light and are generally called photo-alignment methods. These are disclosed in U.S. Pat. Nos. 4,974,941 Gibbons et al, 5,784,139 Chigrinov et al, 5,389,698 Chigrinov et al, and European Patent 0525478B (Hoffman-La Roche et al).

While satisfactory in themselves, the methods disclosed in these patents rely on polarised light. Light sources producing polarised light are comparatively complex, which may be less suitable for mass production, and expensive. As a polariser usually absorbs at least 50% of the light, dispensing with the polariser would allow a much better usage of the light source (either a faster effect, or could use a weaker lamp). Therefore, already certain methods have been suggested, which use non-polarised light.

The generation of a pretilt angle in a nematic liquid crystal cell using a polyimide surface which has been irradiated with non-polarised U.V. light with an angle of incidence of 70° to the normal to the surface has been disclosed by Seo et al in "Asia Display 98" paper P-81, pp 795–798 and in "Liquid Crystals", 1997 vol 23 no. 6 pp 923–925. However, this method does not benefit from the potential advantages which we have identified, requiring instead very high energy input, sufficient to depolymerise the polyimide.

We have found that under certain unexpected circumstances the optical photo-alignment method referred to above also works with light that is non-linearly polarised (e.g. circularly polarised) or isotropic (unpolarised).

BRIEF DESCRIPTION OF THE DRAWINGS

FIG. 1 illustrates an embodiment of the invention. A layer of liquid crystal alignment material (2) placed on a wall of a liquid crystal cell (1) is exposed to radiation (3) from an oblique direction, as shown by the direction of arrow (5). The radiation is zonewise patterned in zones (6) and (7) by interposing a microelement array, for example prism (4) having opaque mask (8) placed thereon, between the source of radiation and material.

SUMMARY OF THE INVENTION

Figure 1:
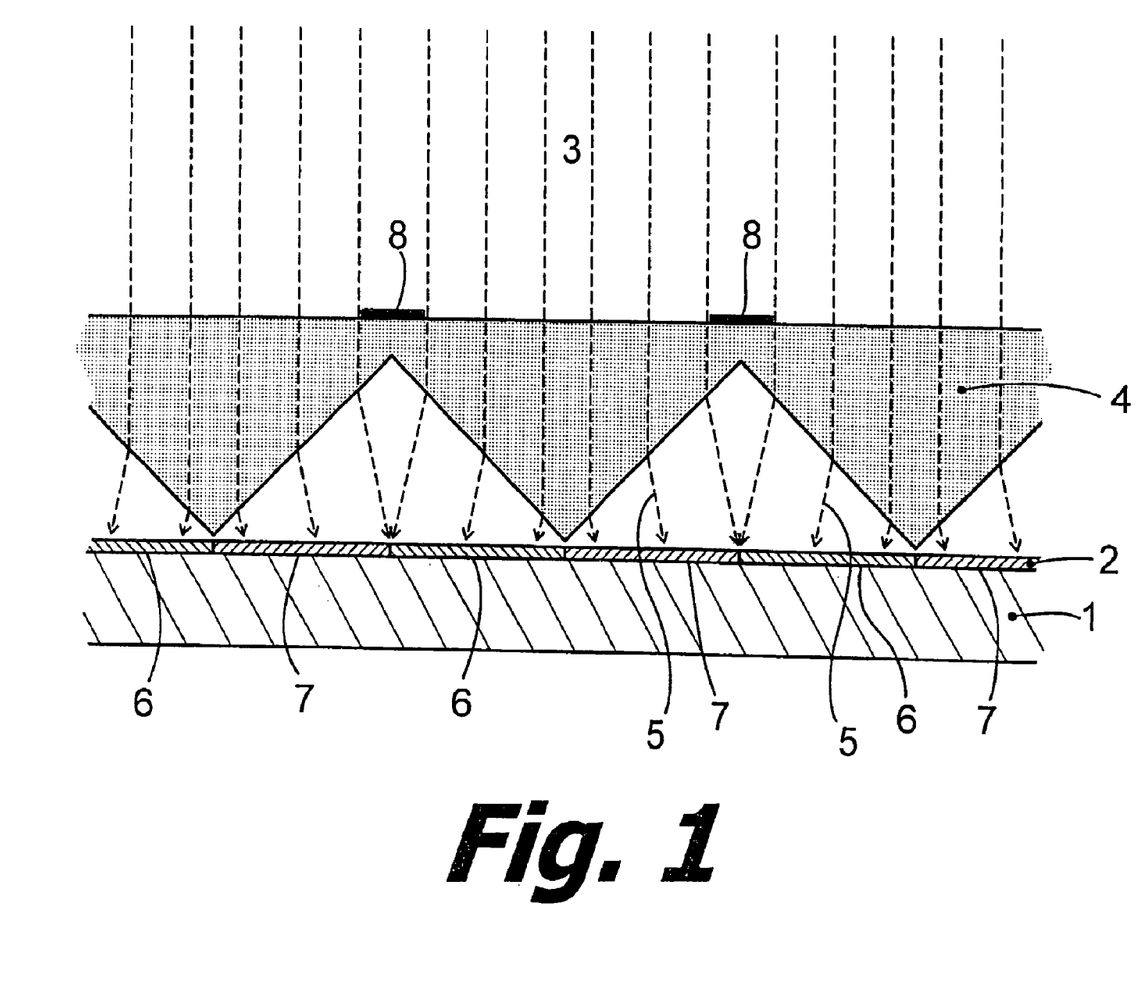
Figure 2:
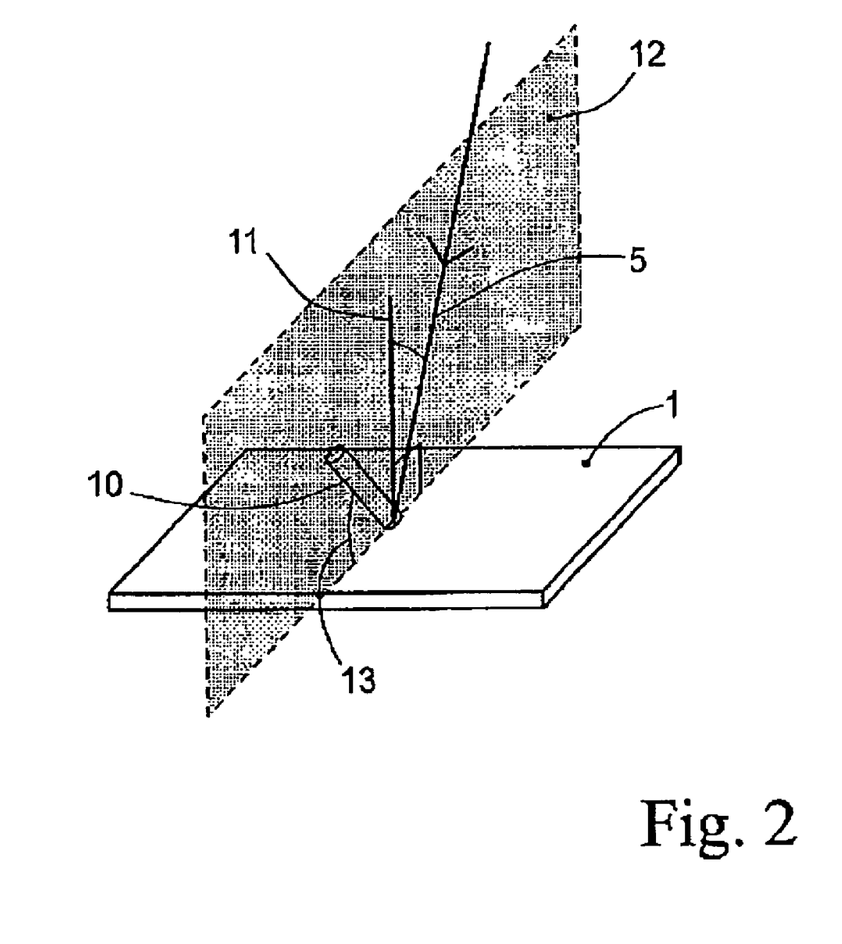
FIG. 2 illustrates the alignment of liquid-crystal molecules. A wall of liquid-crystal cell (1), bearing a layer of liquid-crystal alignment material is exposed to oblique radiation, as shown by the direction of arrow (5). The liquid-crystal molecule (10) under such conditions aligns in the plane (12) defined by the direction of irradiation (5) and by the normal (11) to the layer of liquid-crystal alignment material. The plane (12) thus includes the normal (11) to the layer and the direction of radiation (5). Furthermore, the liquid-crystal molecule shows an imparted tilt (13).
Figure 3:
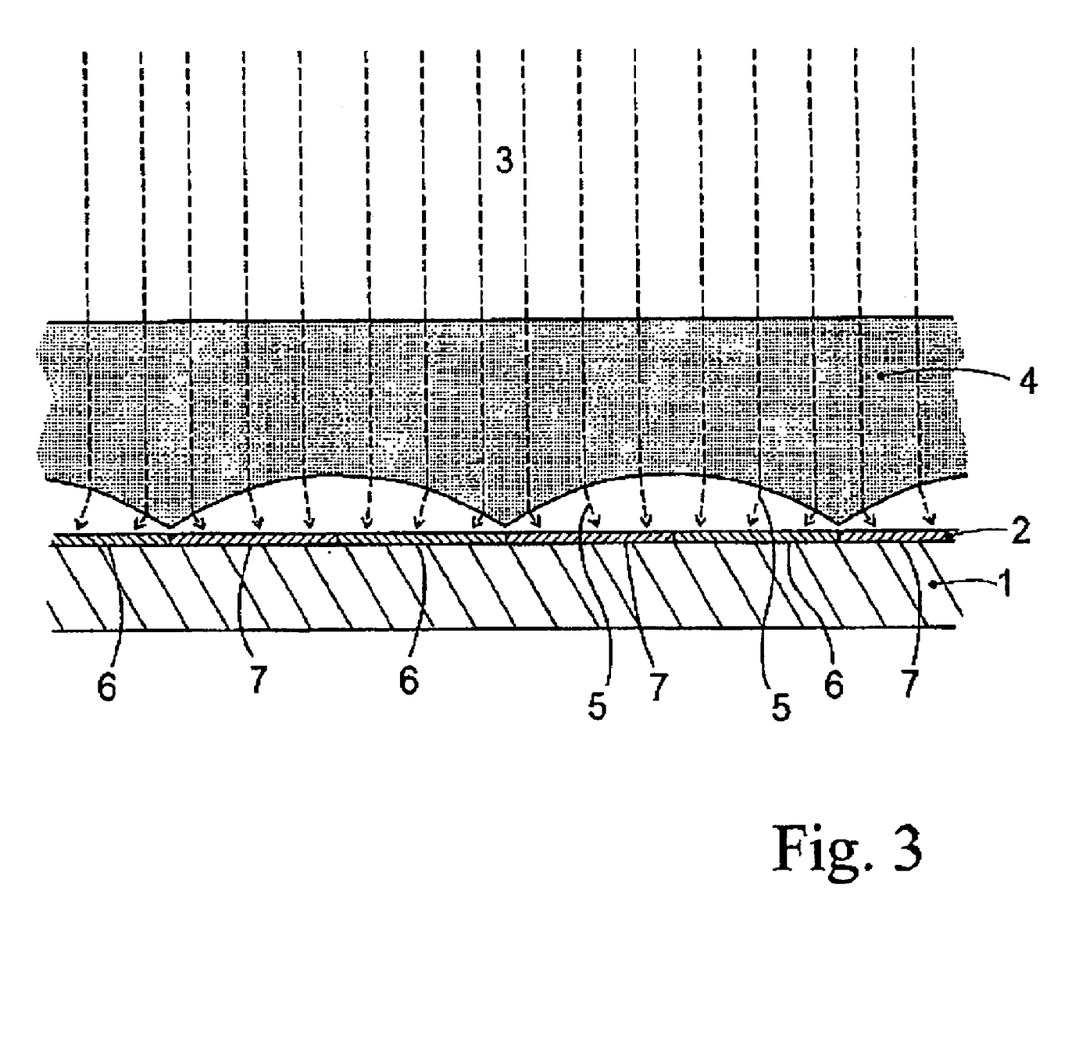
FIG. 3 illustrates the alignment of liquid-crystal molecules by means of a microlens array. A layer of liquid-crystal alignment material (2) placed on a wall of the liquid-crystal cell (1) is exposed to radiation (3) from an oblique direction, as shown by the direction of arrow (5). The radiation is zonewise patterned in zones (6) and (7) by interposing a micro-element array, in this example a microlens array (4), between the source of radiation and material.
Figure 4:
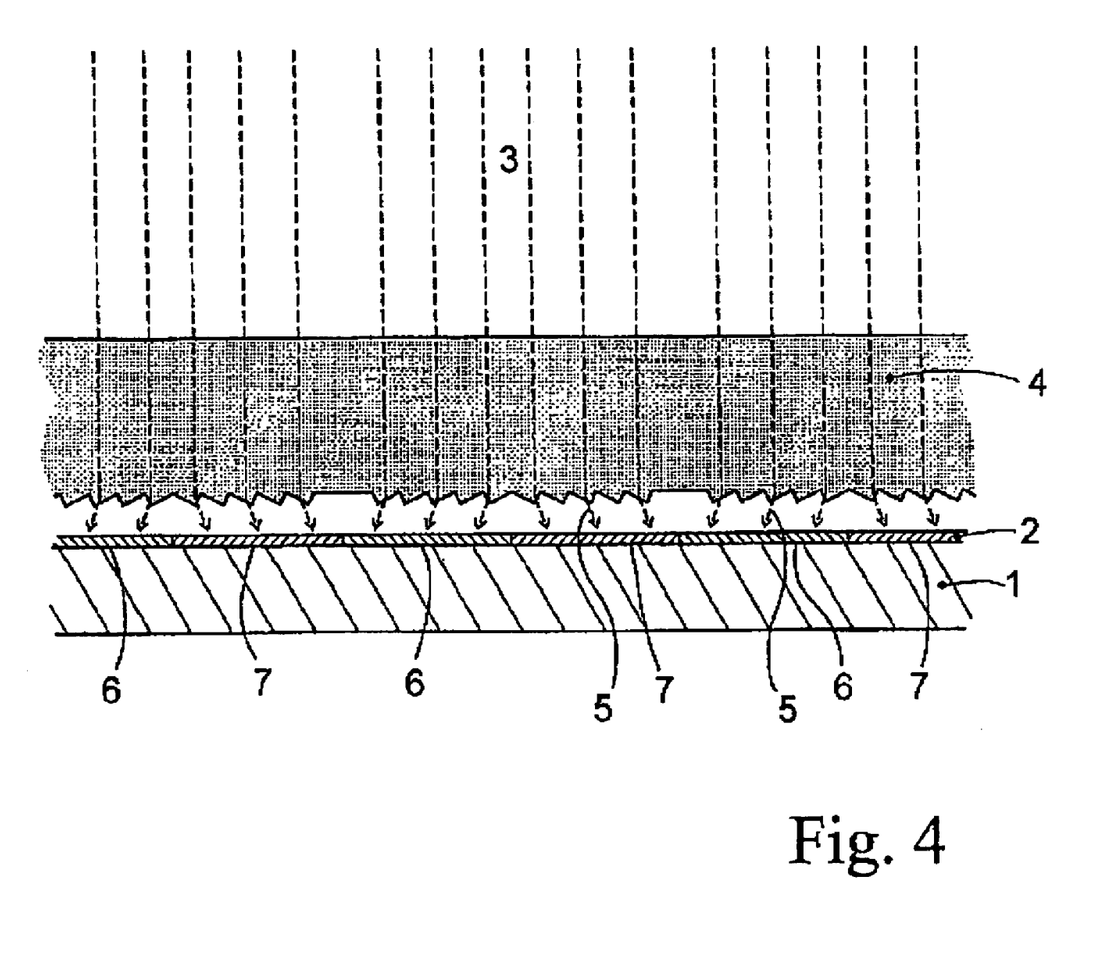
FIG. 4 illustrates the alignment of liquid-crystal molecules by a surface hologram element. A layer of liquid-crystal alignment material (2) placed on a wall of the liquid-crystal cell (1) is exposed to radiation (3) from an oblique direction, as shown by the direction of arrow (5). The radiation is zonewise patterned in zones (6) and (7) by interposing a micro-element array, in this example a hologram element (4), between the source of radiation and material.
Figure 5:
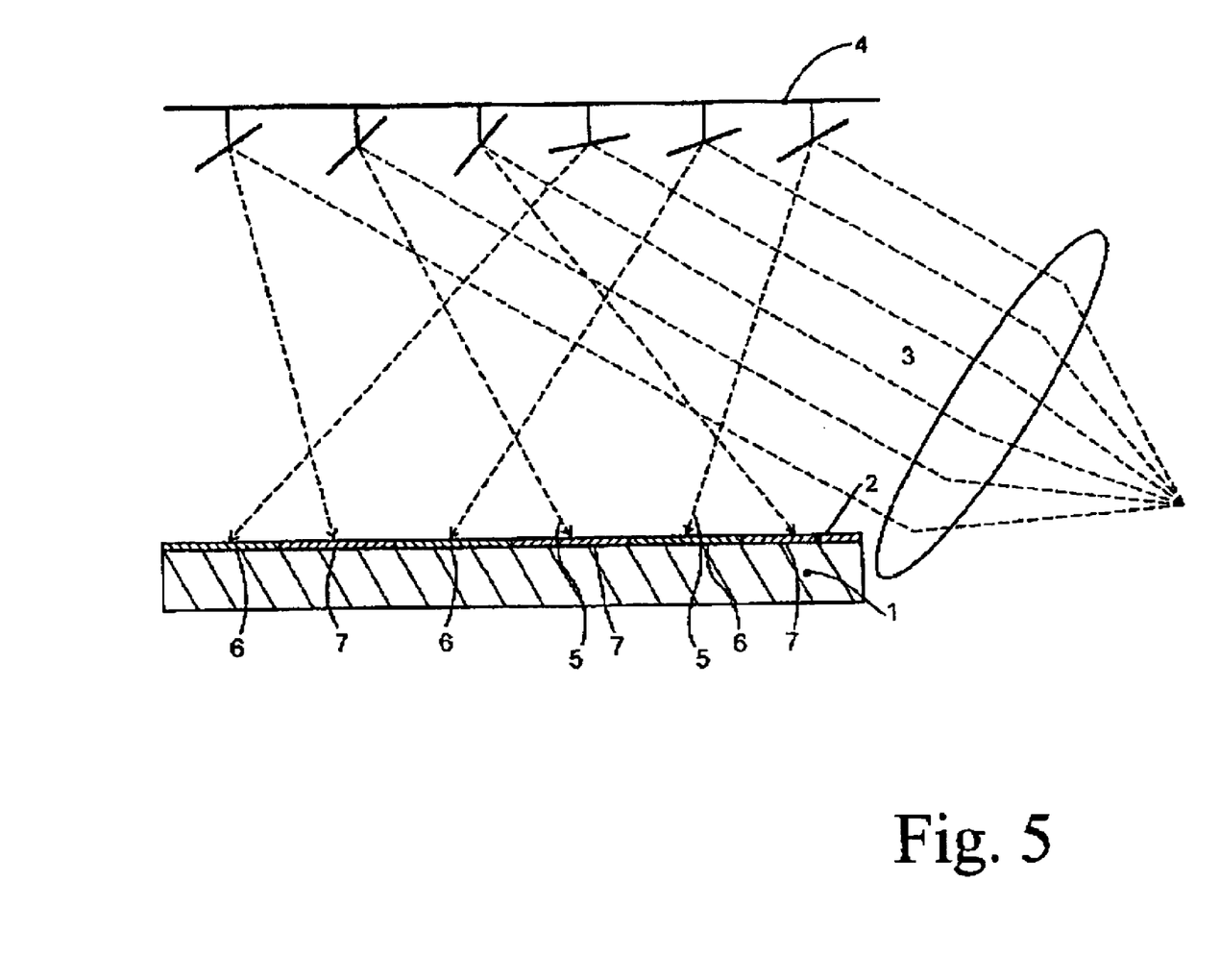
FIG. 5 illustrates the alignment of liquid-crystal molecules by an array of micro-mirrors. A layer of liquid-crystal alignment material (2) placed on a wall of the liquid-crystal cell (1) is exposed to radiation (3) from an oblique direction, as shown by the direction of arrow (5). The radiation is zonewise patterned in zones (6) and (7) by interposing a micro-element array, in this example an array of micro-mirrors (4), between the source of radiation and material.

According to the present invention there is provided a method of making a wall of a liquid crystal cell, comprising imparting a property to a layer of a material on the wall, said property being that liquid crystal molecules placed on the material on the wall in use of the cell adopt a preferred alignment, the method comprising exposing the material to unpolarised or circularly polarised radiation from an oblique direction, wherein the said property further includes imparting a preferred tilt as well as a preferred azimuthal alignment to such liquid crystal molecules.

DETAILED DESCRIPTION OF THE INVENTION

Preferably, the angle of incidence φ of the radiation to the normal to the layer is within the range $5° \leq \phi < 70°$, and more preferably exceeds 45°.

The radiation may be ultraviolet.

The said preferred alignment is preferably such that the longitudinal axis of the liquid crystal molecules is in the plane including the normal to the layer and the direction of the radiation. The imparted preferred tilt preferably exceeds 45° to the plane of the layer, and more preferably exceeds 75°.

In addition, the effect of the irradiation on the material may be to cross-link it, thus also improving the stability of the material and its aligning properties.

As for the radiation to which the material is exposed, this may be zonewise patterned, for example by interposing a microelement array, such as a microlens or microprism array or a suitable hologram element, between the source of the radiation and the material, so that, in said imparted property, the preferred alignment is zonewise patterned. Using such a microelement array further allows to generate locally different oblique radiation from a single radiation source even if the source itself radiates perpendicular to the material layer or the microelement array.

This method when using irradiation with unpolarised, preferably ultraviolet, light in a specific illumination geometry and with a suitable alignment layer material causes the conversion of a layer, which is isotropic before the irradiation, into an anisotropic layer. Layer and method typically have the following characteristic features:

(a) After conversion the layer has an aligning effect on a monomeric or pre-polymeric liquid crystal material put on the layer.

(b) Simultaneously with the generation of anisotropy in the layer, a cross-linking also occurs, i.e. the generation of the alignment capability and the cross-linking are based on a bimolecular photo process, but the method according to the invention can also apply to monomolecular processes, typically using azo dyes.

Where, as desirable, the layer of material has a photo-alignment sensitivity better than 2 J/cm$^2$, and the irradiation energy (measured normal to the radiation) can correspondingly be kept to less than 2 J/cm$^2$, productivity is enhanced since exposure times can then be reduced to less than 10 minutes.

The layers are photo-structurable, i.e. azimuthal alignment and tilt angle can differ in different parts of the layer (e.g. by exposing through photo-masks, holographic imaging, imaging through microelements such as microprisms, microlenses, and pixellated light switches such as micro-mirrors).

On the other hand, devices which are aligned uniformly over large areas may also be made by the method, especially LCP retarders and optical compensators for improving viewing angle of displays.

The layers can find use as alignment layers for liquid crystal devices such as displays; the displays can contain monomeric nematic, cholesteric or smectic (including chiral smectic C) liquid crystals. The operating mode may be transmission or reflection. In reflection both specular metallic or diffuse reflectors can be used, as well as reflectors made of cholesteric layers or polarisation converting optical elements (e.g. BEF foils).

The device substrate may be glass, plastic, a silicon chip, or anything else suitable.

Advantages of bypassing the necessity for polarised light include, apart from those already mentioned, general simplification of the method and making it more adaptable to mass production, and the ability to use microlens-, microprism- or similar arrays for the illumination, leading to a structured alignment with only one irradiation step, not possible with polarised light.

The invention may be used in relation to Vertically Aligned Nematic (VAN) cells, wherein the liquid crystal displays have a tilt angle of $90° \geq \theta > 75°$ on both surfaces, or in relation to Hybrid Aligned Nematic (HAN) cells, where the tilt angle on one surface is $90° \geq \theta_1 > 75°$ and on the other is $\theta_2 \leq 30°$. Intermediate tilt angles on one or both surfaces may also have utility.

The material as such may be substantially homeotropically orienting. That is, the material may be one which induces an (azimuthally unoriented) large tilt angle, not necessarily exactly 90°, but preferably exceeding 80°, more preferably exceeding 85°, to liquid crystal molecules thereon. Particularly where large tilt angles are required, it may be advantageous to start with a substantially homeotropically orienting material, which will need (besides the azimuthal alignment) only a small adjustment of the induced tilt angle to achieve the exact required tilt.

The materials used in the invention may be photopolymerisable polymers, such as those which are also used in the known photo-alignment methods, particularly linearly photopolymerisable polymers.

The materials used can include not only photopolymerisable polymers but also monomolecular aligning materials which are inherently unstable because the photo-alignment does not cross-link them; however this does not matter if a liquid crystal polymer layer is applied while the mono molecular material is photo-aligned, as the said liquid crystal polymer can itself be cross-linked (stabilised in its aligned position), whereafter the instability of the monomolecular material has no damaging effect.

Alternatively, the material may be a polymerisable mixture which comprises (i) a liquid crystal monomer or pre-polymer having cross-linkable groups, and (ii) a photo-orientable monomer or oligomer or polymer. Such mixtures are described in UK Patent Application 9812636.0, the disclosure of which is incorporated herein by reference. Despite the distinct functions of the participating molecules, these mixtures are capable of being both oriented and cross-linked into a liquid crystal polymer. These mixtures are hence usable on the one hand as anisotropic layers in optical components or on the other hand, normally applied more thinly, as orientation layers.

It is understood that substance (i) may also be a liquid crystal polymer mixture, i.e. may contain two or more different liquid crystal molecule types. Equally, substance (ii) may be a mixture of photo-orientable molecules. A preferred photo-orientable substance (ii) comprises molecules showing a cis-trans-isomerism, particularly azo dyes. Another preferred photo-orientable substance (ii) comprises a linearly photo-polymerisable polymer.

The invention extends to a liquid crystal cell wall bearing a layer of material, the layer having the property that liquid crystal molecules placed on the layer adopt a preferred alignment, that property having been imparted to the layer by a method as set forth above.

The invention further extends to a liquid crystal cell of which at least one wall in contact with liquid crystal material is as set forth above.

The invention will now be described by way of example.

EXAMPLE 1

Vertically Aligned Nematic (VAN) Cell

A 2% solution S1 of photopolymer A in cyclopentanone was made and stirred for 30 minutes at room temperature.

Photopolymer A:

x:y = 9:1

Solution S1 was spin-coated at 2000 rpm onto two indium-tin-oxide glass plate substrates which were then dried for 30 minutes on a hotplate at 130° C. All these operations were performed in an environment of reduced ultraviolet light.

The coated substrates were subsequently exposed to isotropic ultraviolet light from a 200 W high-pressure mercury lamp at an angle of incidence of 65° to the normal to the substrates, for six minutes. One edge of each substrate was arranged to lie parallel to the plane containing the normal to the substrate and the direction of the incident light during the exposure.

Ultraviolet edge filter WG295 (Schott) and a bandpass filter UG11 (Schott) were used to restrict the bandwidth of the light, which, using a light intensity meter 1000 with probe set at 320 nm (Carl Süss), was found to have an intensity measured at the substrate (but normal to the incident radiation) of 2 mW/cm². A parallel-sided cell was constructed using these two substrates, coatings facing each other and spaced 2.7 μm apart using plastic shims. The cell was then filled at room temperature with "Liquid Crystal Mixture 8987" available from Rolic Research Ltd of Switzerland, having a dielectric anisotropy of Δε=−3.5, an optical anisotropy of Δn=0.096, and a liquid crystal-isotropic transition temperature $T_c$ of 77.3° C.

When the cell was viewed between crossed polarisers, it appeared dark at all azimuth angles of the cell with respect to the polarisers, in other words the liquid crystal mixture was homeotropic.

Upon applying 5V 90 Hz a.c. between the electrodes of the substrates, then (i) the cell became maximally transmissive to light when arranged with its edges at 45° to the directions of polarisation of the crossed polarisers, and (ii) the cell became maximally dark when arranged with its edges parallel and perpendicular to the directions of polarisation of the crossed polarisers. This demonstrates that the liquid crystal mixture had become oriented in a sense dependent upon the plane of incidence of the original layer-irradiating light (which, as will be recalled, was parallel to an edge of the substrate and hence of the cell).

Using a tilting compensator, it was established that the optical axis of the switched liquid crystal lay parallel to the line of intersection of the substrate and the plane of the original incident irradiating ultraviolet light.

Repeating the above application of alternating current but with a potential difference of only 3V, then under viewing condition (i) the cell appeared only weakly transmissive viewed normally to its plane, in other words the liquid crystal director $\bar{n}$ was only slightly tilted. To ascertain the tilt direction of the liquid crystal, the cell was tilted about that axis lying in the plane of the cell which was perpendicular to the plane including $\bar{n}$, until it again appeared dark. In this orientation, the cell was effectively being viewed along the optical axis, i.e. $\bar{n}$. This revealed that the direction of tilt of the liquid crystal with respect to the normal to the cell was the reverse of the direction of incidence of the original ultraviolet irradiation.

Whether with or without an applied voltage, the orientation of the liquid crystal was uniform without dislocations or domain boundaries. In particular, upon switching, no so-called reverse tilt domains were generated such as would arise if the liquid crystal molecules had, through too small a tilt angle in the orientation layer, been reverse-tilted in some areas.

EXAMPLE 2

Pretilt Angle Measurement

As in Example 1, two ITO-coated glass plates were spin-coated with solution S1 and dried at 130° C. for 30 minutes.

Both substrates were subsequently exposed for six minutes to isotropic uv-light having an incidence angle of 65° respective to the substrate normal. The spectral range of the light was restricted by a uv-cutoff filter WG295 (Schott) and a band pass filter UG11 (Schott). The intensity of the uv-light at the position of the photosensitive layer was measured to be 2 mW/cm² using the light intensity measurement instrument of Carl Süss together with the 320 nm probe (Carl Süss).

In order to measure the pretilt angle induced by the aligning layers a parallel cell was assembled with the above illuminated substrates. The cell gap was set to 20 μm using two quartz fibers as spacers. Prior to filling the cell with a negative dielectric liquid crystal mixture having a dielectric anisotropy of −5.1, an optical anisotropy Δn of 0.0984, and a liquid crystal-isotropic transition temperature $T_c$ of 75.8° C. (mixture no. 9383, available from Rolic Research Ltd., Switzerland), the cell was heated to 90° C. to ensure the filling procedure to take place in the isotropic phase of the liquid crystal mixture. After filling, the cell was cooled down to room temperature at a rate of 1° C./minute.

For pretilt angle measurement the crystal rotation method was employed. As a result of the measurement the liquid crystal director was found to be tilted by 3° off the substrate normal.

EXAMPLE 3

Liquid Crystal Polymer (LCP) Component

First a 2 wt % solution S2 of the photoaligning material B was prepared using cyclopentanone as a solvent. The solution was stirred for 30 minutes at room temperature.

Photopolymer B:

Then a mixture $M_{LCP}$ was prepared which comprised the following liquid crystalline diacrylate monomers:

Mon1:

Mon2:

Mon3:

In addition to the diacrylate monomers, photoinitiator IRGACURE 369 from Ciba SC as well as BHT (2,6-di-tert-butyl-4-methylphenol/"butyl hydroxytoluene") which served as an inhibitor were added to the mixture. Thus the composition of mixture $M_{LCP}$ was as follows:

| | |
|---|---|
| Mon1 | 77 wt % |
| Mon2 | 14.5 wt % |
| Mon3 | 4.7 wt % |
| Irgacure 369 | 1.9 wt % |
| BHT | 1.9 wt % |

Finally, the solution S(LCP) resulted from dissolving 10 wt % of mixture $M_{LCP}$ in anisole.

The layer preparation started with spincoating solution S2 on a 1 mm thick rectangular glass substrate using 3000 rpm for 1 minute as spinning parameters. The layer was subsequently dried on a hotplate at 130° C. for 30 minutes.

Then the coated substrate was exposed for six minutes to the isotropic uv-light of a 200 W high pressure mercury lamp having an incidence angle of 65° relative to the substrate normal. The incidence plane of the uv-light, which was defined by the substrate normal and the light incidence direction, was aligned parallel to the longer edge of the substrate. The spectral range of the light was restricted by a uv-cutoff filter WG295 (Schott) and a band pass filter UG11 (Schott). The intensity of the uv-light at the position of the photosensitive layer was measured to be 2 mW/cm² using the light intensity measurement instrument of Carl Süss together with the 320 nm probe (Carl Süss).

When the substrate was arranged between crossed polarizers the substrate looked dark, independent of the angle between substrate edges and polarizer transmission axes. Consequently, there was no recognizable birefringence induced in the photosensitive layer.

As a next step, a layer of $M_{LCP}$ was prepared on top of the uv-exposed photosensitive layer by spincoating solution S(LCP) with 1000 rpm for two minutes. The substrate was then heated up to 70° C., which was just above the clearing temperature $T_c$=68° C. of mixture $M_{LCP}$, and cooled down to 65° C. using a cooling rate of 0.1° C./min. Subsequently the $M_{LCP}$ layer was crosslinked under nitrogen atmosphere by exposing it to the light of a 150 W xenon lamp for 10 minutes. A thickness of 250 nm was measured for the crosslinked $M_{LCP}$ layer.

When the substrate was arranged between crossed polarizers with an angle of 45° between the substrate edges and the transmission axes of the polarizers the substrate looked gray. However, the substrate looked dark when arranging its edges either parallel or perpendicular to the polarizer transmission axes. Consequently, the $M_{LCP}$ layer was birefringent with the optical axis aligned either parallel or perpendicular to the longer substrate edge. However, using a tilting compensator the optical axis of the $M_{LCP}$ layer was found to be parallel to the longer substrate edge, which was arranged parallel to the incidence plane of the uv-light during the illumination of the photoaligning material JP265.

In addition to the azimuthal alignment, it was found that the optical axis of the $M_{LCP}$ layer was tilted respective to the substrate surface, with a mean tilt angle of about 30° off the substrate plane. From the viewing angle dependence of the optical appearance, it was concluded that the optical axis in the $M_{LCP}$ layer was tilted opposite to the incidence direction of the uv-light which was used for illumination of the photoaligning layer.

Consequently, the exposure to obliquely incident isotropic uv-light induced an aligning capability in the photoaligning material which was strong enough to align the liquid crystal monomers of mixture $M_{LCP}$ parallel to the incidence plane of the uv-light as well as to uniformly tilt the $M_{LCP}$ molecules out of the layer plane.

What is claimed is:

1. A method of making an alignment layer on a wall of a liquid crystal cell, comprising imparting a property to a layer of a material on the wall, said properly being that when liquid crystal molecules are placed on the layer they will adopt a preferred alignment, the method comprising exposing the layer of material to unpolarized or circularly polarized radiation from an oblique direction, wherein the property of the alignment layer imparts a preferred tilt as well as a preferred azimuthal alignment to such liquid crystal molecules, wherein multiple local zones of the layer of material are exposed to radiation, the oblique angle of the radiation being uniform within each local zone but different between two or more zones, by interposing a microelement array between the source of the radiation and the layer of material to generate locally different oblique radiations on the multiple zones in one radiation step, and such liquid crystal molecules are zonewise aligned.

2. A method according to claim 1, were the radiation energy, measured normal to the radiation, is less than 2 J/cm².

3. A method according to claim 1, wherein the radiation is ultraviolet.

4. A method according to claim 1, wherein the alignment is such that the longitudinal axis of the liquid crystal molecules is in the plane including the normal to the layer and the direction of the radiation.

5. A method according to claim 1, wherein the alignment layer imparts a preferred tilt exceeding 45° to the plane of the layer.

6. A method according to claim 5, wherein the alignment layer imparts a preferred tilt exceeding 75° to the plane of the layer.

7. A method according to claim 1, wherein the preferred tilt that has been imparted is substantially homeotropic.

8. A method according to claim 1, wherein the angle of incidence $\phi$ of the radiation to the normal to the layer of material is within the range $5 \leq \phi \leq 70°$.

9. A method according to claim 1, wherein the angle of incidence $\phi$ of the radiation to the normal to the layer of material is >45°.

10. A method according to claim 1, wherein the layer of material is cross-linked by the radiation.

11. A method according to claim 1, wherein the microelement array is a microlens array.

12. A method according to claim 1, wherein the microelement array is a microprism array.

13. A method according to claim 1, wherein the microelement array is a hologram element.

14. A method according to claim 1, wherein the microelement array is an array of micro-mirrors.

15. A liquid crystal cell wall bearing a layer of material, wherein the layer of material has been exposed to unpolarised a circularly polarised radiation from an oblique direction, wherein multiple local zones of the layer of material have been exposed to radiation, the oblique angle of the radiation being uniform within each local zone but different between two or more zones, by interposing a microelement array between the source of the radiation and the layer of material to generate locally different oblique radiations on the multiple zones in one radiation step, and wherein the layer of material can impart an alignment to liquid crystal molecules if placed on the layer of material, wherein liquid crystal molecules placed on the layer of material would be zonewise aligned.

16. A liquid crystal cell of which at least one wall in contact with liquid crystal material is according to claim 15.

17. A liquid crystal cell according to claim 16, which is vertically aligned nematic.

18. A liquid crystal cell according to claim 16, which is hybrid aligned nematic.

* * * * *